US012049891B2

(12) United States Patent
Holbrook et al.

(10) Patent No.: US 12,049,891 B2
(45) Date of Patent: Jul. 30, 2024

(54) SCROLL PUMP HAVING A BIASING APPARATUS FOR AXIALLY MOVABLE FIXED AND ORBITING SCROLLS AGAINST EACH OTHER VIA FIRST AND SECOND PADS THAT FORMED MATERIAL FROM FIXED AND ORBITING SCROLLS

(71) Applicant: Edwards Limited, Burgess Hill (GB)

(72) Inventors: Alan Ernest Kinnaird Holbrook, Burgess Hill (GB); Nigel Paul Schofield, Burgess Hill (GB)

(73) Assignee: Edwards Limited, Burgess Hill (GB)

( * ) Notice: Subject to any disclaimer, the term of this patent is extended or adjusted under 35 U.S.C. 154(b) by 73 days.

(21) Appl. No.: 17/628,784

(22) PCT Filed: Jul. 22, 2020

(86) PCT No.: PCT/EP2020/070630
§ 371 (c)(1),
(2) Date: Jan. 20, 2022

(87) PCT Pub. No.: WO2021/013872
PCT Pub. Date: Jan. 28, 2021

(65) Prior Publication Data
US 2022/0397115 A1 Dec. 15, 2022

(30) Foreign Application Priority Data
Jul. 22, 2019 (GB) ..................................... 1910471

(51) Int. Cl.
*F03C 2/00* (2006.01)
*F03C 4/00* (2006.01)
(Continued)

(52) U.S. Cl.
CPC .......... *F04C 18/0215* (2013.01); *F04C 2/025* (2013.01); *F04C 15/0023* (2013.01);
(Continued)

(58) Field of Classification Search
CPC .............. F04C 18/0215; F04C 18/0223; F04C 18/0246; F04C 18/0253; F04C 2/025;
(Continued)

(56) References Cited

U.S. PATENT DOCUMENTS 4,160,629 A 7/1979 Hidden et al.
4,487,560 A 12/1984 Uchikawa et al.
(Continued)

FOREIGN PATENT DOCUMENTS

CN 102257244 A 11/2011
CN 102472272 A 5/2012
(Continued)

OTHER PUBLICATIONS

JP-2003286974-A—Hirai et al.—Scroll Type Fluid machine E.g. Scroll Type Pump has Backing Pressure Application Device which is Provided Between Back of Movable Scroll and Base of Housing, and whichi s made to Track Rotation of Movable Scroll (Year: 2003).*

(Continued)

*Primary Examiner* — Theresa Trieu
(74) *Attorney, Agent, or Firm* — Theodore M. Magee; Westman, Champlin & Koehler, P.A.

(57) ABSTRACT

A scroll pump (100, 200) comprising a first scroll comprising a first spiral wall (124, 224); a second scroll comprising a second spiral wall (134, 234), the second spiral wall being intermeshed with the first spiral wall; and a pad (180, 280) formed from a different material to the first and second scrolls, the pad being located between the first and second scrolls radially inwards or outwards of the first and second spiral walls.

10 Claims, 3 Drawing Sheets

(51) Int. Cl.

| | |
|---|---|
| ***F04C 2/00*** | (2006.01) |
| ***F04C 2/02*** | (2006.01) |
| ***F04C 15/00*** | (2006.01) |
| ***F04C 18/00*** | (2006.01) |
| ***F04C 18/02*** | (2006.01) |
| ***F04C 27/00*** | (2006.01) |
| *F04C 23/00* | (2006.01) |

(52) U.S. Cl.
CPC .......... *F04C 27/005* (2013.01); *F04C 23/008* (2013.01); *F04C 2240/801* (2013.01); *F05C 2225/04* (2013.01)

(58) Field of Classification Search
CPC .. F04C 15/0023; F04C 27/005; F04C 23/008; F04C 2240/801; F05C 2201/00; F05C 2201/021; F05C 2225/00; F05C 2225/04
See application file for complete search history.

(56) References Cited

U.S. PATENT DOCUMENTS

| | | | | |
|---|---|---|---|---|
| 5,192,202 | A * | 3/1993 | Lee | F04C 27/005 418/55.5 |
| 5,383,772 | A * | 1/1995 | Richardson, Jr. | F04C 27/005 418/55.5 |
| 5,727,934 | A | 3/1998 | Sekita et al. | |
| 6,146,119 | A | 11/2000 | Bush et al. | |
| 2006/0228244 | A1* | 10/2006 | Goodwin | F04C 18/0269 418/55.2 |

FOREIGN PATENT DOCUMENTS

| | | | | |
|---|---|---|---|---|
| CN | 207960944 | U | 10/2018 | |
| CN | 109312744 | A | 2/2019 | |
| EP | 0404512 | A2 | 12/1990 | |
| EP | 1227245 | A2 | 7/2002 | |
| GB | 2054044 | A | 2/1981 | |
| GB | 2548607 | A | 9/2017 | |
| JP | 1980035155 | A | 3/1980 | |
| JP | S61258989 | A | 11/1986 | |
| JP | H0211881 | A | 1/1990 | |
| JP | H0633780 | B2 | 5/1994 | |
| JP | H09126165 | A | 5/1997 | |
| JP | H10141255 | A | 5/1998 | |
| JP | 2003286974 | A * | 10/2003 | F04C 18/0207 |
| JP | 2009115055 | A | 5/2009 | |
| JP | 5535155 | B2 | 7/2014 | |
| WO | 0006906 | A1 | 2/2000 | |

OTHER PUBLICATIONS

British Examination Report dated Dec. 20, 2019 and Search Report dated Dec. 19, 2019 for corresponding British Application No. GB1910471.0, 6 pages.

International Search Report dated Sep. 18, 2020 for corresponding PCT application Serial No. PCT/EP2020/070630, 4 pages.

International Written Opinion dated Sep. 18, 2020 for corresponding PCT application Serial No. PCT/EP2020/070630, 5 pages.

Response dated Dec. 8, 2020 for corresponding PCT application Serial No. PCT/EP2020/070630, 2 pages.

Chinese First Office Action dated Feb. 8, 2023 and Search Report dated Feb. 7, 2023 for corresponding Chinese application Serial No. CN202080052944.7, 10 pages.

Japanese Notice of Reason for Rejection dated Mar. 21, 2024 for corresponding Japanese application Serial No. JP2022-503842, 4 pages.

* cited by examiner

SCROLL PUMP HAVING A BIASING APPARATUS FOR AXIALLY MOVABLE FIXED AND ORBITING SCROLLS AGAINST EACH OTHER VIA FIRST AND SECOND PADS THAT FORMED MATERIAL FROM FIXED AND ORBITING SCROLLS

CROSS-REFERENCE OF RELATED APPLICATION

This application is a Section 371 National Stage Application of International Application No. PCT/EP2020/070630, filed Jul. 22, 2020, and published as WO 2021/013872 A1 on Jan. 28, 2021, the content of which is hereby incorporated by reference in its entirety and which claims priority of British Application No. 1910471.0, filed Jul. 22, 2019.

FIELD

The present invention relates to scroll pumps.

BACKGROUND

Scroll pumps are a known type of pump used in various different industries (e.g. in semi-conductor fabrication). Scroll pumps operate by using the relative motion of two intermeshed "scrolls" to pump fluid.

In scroll pumps, it tends to be desirable to maintain a seal at points of contact between the two scrolls to prevent undesired fluid leakage into certain areas of the scroll pump. It also tends to be desirable to improve the durability of the components of the scroll pump.

The discussion above is merely provided for general background information and is not intended to be used as an aid in determining the scope of the claimed subject matter. The claimed subject matter is not limited to implementations that solve any or all disadvantages noted in the background.

SUMMARY

According to a first aspect of the invention, there is provided a scroll pump comprising: a first scroll comprising a first spiral wall; a second scroll comprising a second spiral wall, the second spiral wall being intermeshed with the first spiral wall; and a pad formed from a different material to the first and second scrolls, the pad being located between the first and second scrolls radially inwards of the first and second spiral walls.

The scroll pump may further comprise a biasing apparatus configured to bias the first and second scrolls against each other via the pad.

The pad may be formed from a polymer material.

The first and/or second scrolls may be formed from a metallic material.

The pad may be formed from a polytetrafluoroethylene material.

The first and/or second scrolls may be formed from aluminium.

The scroll pump may further comprise a channel seal located between the first and second scrolls.

The pad may be integrally formed with the channel seal.

The pad may be formed from the same material as the channel seal.

The scroll pump may comprise a first pad formed from a different material to the first and second scrolls, the first pad being located between the first and second scrolls radially outwards of the first and second spiral walls, and the pad which is located between the first and second scrolls radially inwards of the first and second spiral walls may be a second pad.

The second pad may be formed from the same material as the first pad.

The first and/or second pads may be formed from the same material as the channel seal.

The first and/or second pads may be integrally formed with the channel seal.

The first and second scrolls may each comprise a central aperture. The second pad may be adjacent to the central apertures.

The scroll pump may further comprise a drive shaft coupled to the second scroll and configured to cause the second scroll to orbit relative to the first scroll.

The drive shaft may extend through the central apertures.

The pad may comprise a plurality of lobes.

According to a second aspect of the invention, there is provided use of the scroll pump of the first aspect to pump fluid.

According to a third aspect of the invention, there is provided a scroll pump comprising: a first scroll comprising a first spiral wall; a second scroll comprising a second spiral wall, the second spiral wall being intermeshed with the first spiral wall; and a pad formed from a different material to the first and second scrolls, the pad being located between the first and second scrolls radially outwards of the first and second spiral walls.

The scroll pump may further comprise a biasing apparatus configured to bias the first and second scrolls against each other via the pad.

The pad may be formed from a polymer material.

The first and/or second scrolls may be formed from a metallic material.

The pad may be formed from a polytetrafluoroethylene material.

The first and/or second scrolls may be formed from aluminium.

The scroll pump may further comprise a channel seal located between the first and second scrolls.

The pad may be integrally formed with the channel seal.

The pad may be formed from the same material as the channel seal.

The scroll pump may comprise a second pad formed from a different material to the first and second scrolls, the second pad being located between the first and second scrolls radially inwards of the first and second spiral walls, and the pad which is located between the first and second scrolls radially outwards of the first and second spiral walls may be a first pad.

The second pad may be formed from the same material as the first pad.

The first and/or second pads may be formed from the same material as the channel seal.

The first and/or second pads may be integrally formed with the channel seal.

The first and second scrolls may each comprise a central aperture. The second pad may be adjacent to the central apertures.

The scroll pump may further comprise a drive shaft coupled to the second scroll and configured to cause the second scroll to orbit relative to the first scroll.

The drive shaft may extend through the central apertures.

The pad may comprise a plurality of lobes.

According to a fourth aspect of the invention, there is provided use of the scroll pump of the third aspect to pump fluid.

The Summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

DETAILED DESCRIPTION

Figure 1:
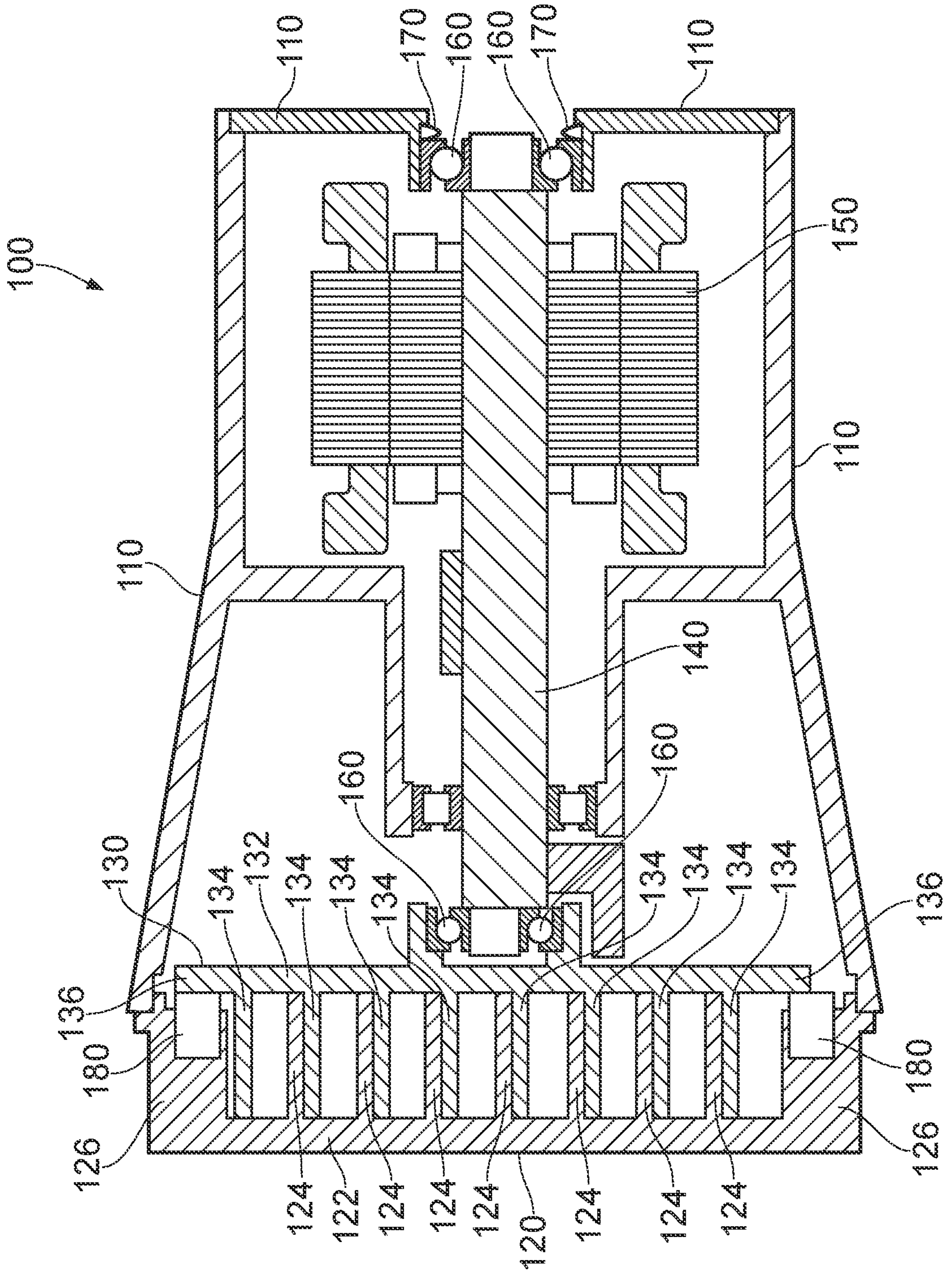
FIG. 1 is a schematic illustration (not to scale) showing a cross-sectional view of a scroll pump according to an embodiment.

FIG. 1 is a schematic illustration (not to scale) showing a scroll pump 100 according to an embodiment.

The scroll pump 100 comprises a shell 110, a fixed scroll 120, an orbiting scroll 130, a drive shaft 140, an actuator 150, a plurality of bearings 160, a biasing apparatus 170, and a pad 180.

In this embodiment, the shell 110 and the fixed scroll 120 together form an overall housing of the scroll pump 100 within which the rest of the components of the scroll pump 100 are located. However, it will be appreciated that, in other embodiments, the fixed scroll 120 may not form part of the overall housing of the scroll pump 100 and instead may be located entirely within the overall housing.

The orbiting scroll 130 is located within the overall housing of the scroll pump 100 and intermeshed with the fixed scroll 120. The orbiting scroll 130 is configured to orbit relative to the fixed scroll 120 to pump fluid from an inlet (not shown) of the scroll pump 100 to an outlet (not shown) of the scroll pump 100. The physical mechanism by which fluid is pumped by the orbiting of the orbiting scroll 130 relative to the fixed scroll 120 is well known and will not be described herein.

The fixed scroll 120 comprises a first base 122, a first spiral wall 124, and an outer wall 126. The orbiting scroll 130 comprises a second base 132 and a second spiral wall 134.

The first spiral wall 124 extends perpendicularly from the first base 122 towards the second base 132. The outer wall 126 extends perpendicularly from the first base 122 towards the second base 132. The outer wall 126 is located radially outwards of the first spiral wall 124 and defines an outer periphery of the fixed scroll 120. Thus, the outer wall 126 extends around the first spiral wall 124. The second spiral wall 134 extends perpendicularly from the second base 132 towards the first base 122. The second base 132 comprises a peripheral portion 136 which is located radially outwards of the second spiral wall 134 and which defines an outer periphery of the orbiting scroll 130. In this embodiment, the first base 122, first spiral wall 124, outer wall 126 are integrally formed with each other. Also, in this embodiment, the second base 132 and second spiral wall 134 are integrally formed with each other.

The first spiral wall 124 and second spiral wall 134 are intermeshed with each other such that an end surface of the first spiral wall 124 is in contact with an opposing surface of the second base 132, and an end surface of the second spiral wall 134 is in contact with an opposing surface of the first base 122. In this way, the first base 122, first spiral wall 124, second base 132 and second spiral wall 134 together define a space between the fixed and orbiting scrolls 120, 130 which is used by the scroll pump 100 during operation to pump fluid. The first and second spiral walls 124, 134 each define a respective spiral shaped channel between the turns of the spiral wall.

The drive shaft 140 is coupled to the orbiting scroll 130 and configured to rotate to drive the orbiting of the orbiting scroll 130. The drive shaft 140 is located within the overall housing of the scroll pump 120. In this embodiment, the drive shaft 140 is coupled to the orbiting scroll 130 and shell 110 via a plurality of bearings 160 which facilitate rotation of the drive shaft 140.

The actuator 150 (e.g. a motor) is coupled to the drive shaft 140 and configured to actuate the drive shaft 140 to cause the drive shaft 140 to rotate to drive the orbiting of the orbiting scroll 130. The actuator 150 is located within the overall housing of the scroll pump 120.

The biasing apparatus 170 is configured to bias the fixed and orbiting scrolls 120, 130 against each other. More specifically, the biasing apparatus 170 is configured to bias the orbiting scroll 130 towards the fixed scroll 120 such that the orbiting scroll 130 is axially loaded against the fixed scroll 120. In more detail, the biasing is such that the end surface of the first spiral wall 124 is pressed against the opposing surface of the second base 132, and the end surface of the second spiral wall 134 is pressed against the opposing surface of the first base 122. Thus, part of the axial load on the fixed and orbiting scrolls 120, 130 is supported by the end surfaces of the first and second spiral walls 124, 134. The axial loading caused by the biasing apparatus 170 maintains a seal between the end surfaces of the first and second spiral walls 124, 134 and the respective opposing surfaces of the first and second bases 122, 132. This tends to act to prevent undesired leakage of fluid between different radial portions of the space between the fixed and orbiting scrolls 120, 130. In this embodiment, the biasing apparatus 170 comprises one or more springs which are configured to exert a force on the orbiting scroll 130 via the drive shaft 140 to bias the orbiting scroll 130 towards the fixed scroll 120.

The pad 180 is located radially outwards of the first and second spiral walls 124, 134. More specifically, the pad 180 is located between the outer wall 126 of the fixed scroll 120 and the base 132 of the orbiting scroll 130. More specifically, the pad 180 is located between the outer wall 126 and the peripheral portion 136 of the second base 132 such that the pad 180 is in contact with both the outer wall 126 and the peripheral portion 136. In other words, the pad 180 is sandwiched between the outer wall 126 and the peripheral portion 136 of the second base 132. In this way, the pad 180 is located such that part of the axial load on the fixed and orbiting scrolls 120, 130 is supported by the pad 180. Thus, the peripheral portion 136 is biased against the outer wall 126 via the pad 180. The pad 180 is formed from a different material to the fixed and orbiting scrolls 120, 130.

In this embodiment, the pad 180 is an annular ring of material embedded in the outer wall 126 of the fixed scroll 120. The pad 180 is formed from a material with high wear resistance when slid against the material or materials from which the fixed and orbit scrolls 120, 130 are made. For example, the pad 180 may be able to withstand a contact load of 10N to 1000N at a sliding speed of 0.2 m/s to 5 m/s for a service life of 1 to 10 years. For example, the first pad 180 may be formed from a polymer material (e.g. a polytetrafluoroethylene material, optionally comprising carbon and/or glass to improve wear resistance) and the fixed and orbiting scrolls 120, 130 may be formed from a metallic material (e.g. a light-weight metallic material such as aluminium, magnesium or titanium). Aluminium may be particularly desirable as it is a relatively low cost light-weight material.

In this embodiment, during operation of the scroll pump 100 in which the orbiting scroll 130 orbits relative to the fixed scroll 120, the end surfaces of the first and second spiral walls 124, 134 slide against the respective opposing surfaces of the first and second bases 122, 124. This in combination with the above-mentioned axial loading means that the end surfaces tend to experience significant frictional forces during operation of the scroll pump 100. The presence of the pad 180, which supports at least part of the axial load, tends to mean that a smaller proportion of the axial load is supported by the end surfaces of the first and second spiral walls 124, 134. This, in turn, tends to reduce the frictional forces on the end surfaces of the first and second spiral walls 124, 134, which tends to reduce wear on the spiral walls 124, 134.

Figure 2:
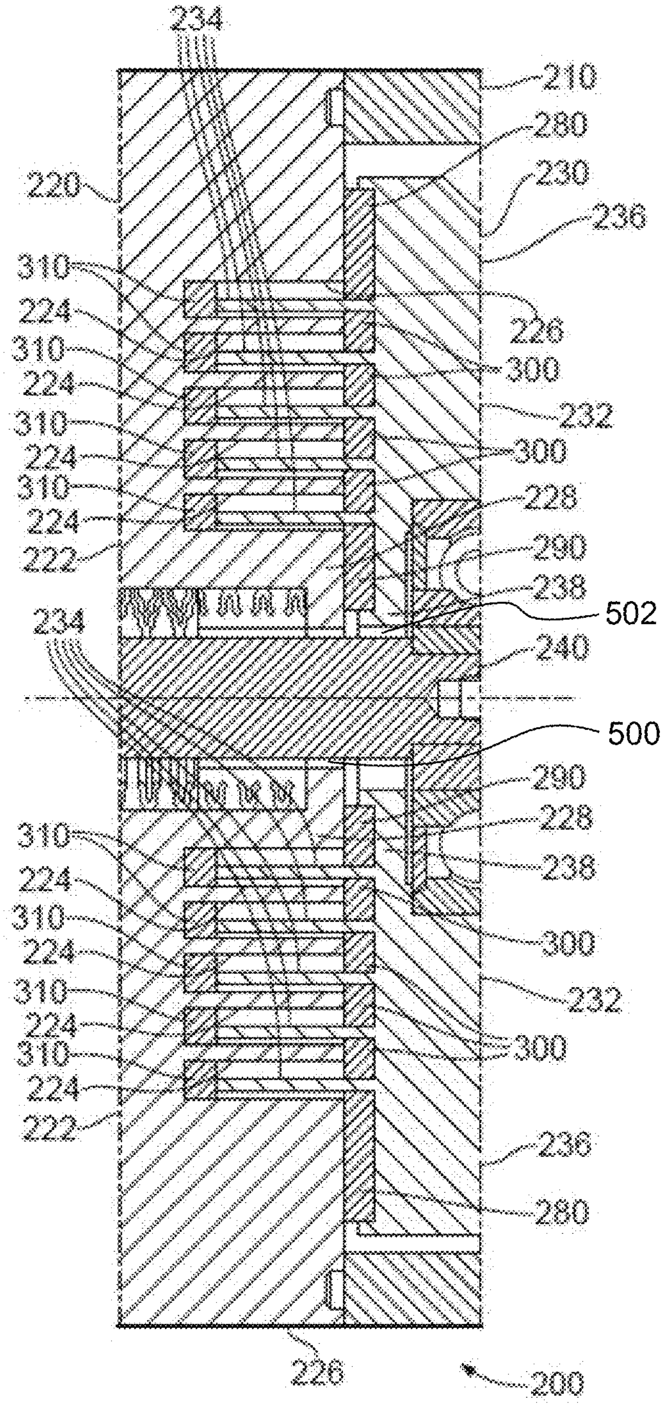
FIG. 2 is a schematic illustration (not to scale) showing a cross-sectional view of part of a scroll pump according to another embodiment.

FIG. 2 is a schematic illustration (not to scale) showing a cross-sectional view of part of a scroll pump 200 according to another embodiment.

The scroll pump 200 comprises a shell 210, a fixed scroll 220, an orbiting scroll 230, a drive shaft 240, an actuator (not shown), a plurality of bearings (not shown), a biasing apparatus (not shown), a first pad 280, a second pad 290, a first channel seal 300, and a second channel seal 310.

In this embodiment, the shell 210 and the fixed scroll 220 together form an overall housing of the scroll pump 200 within which the rest of the components of the scroll pump 200 are located. However, it will be appreciated that, in other embodiments, the fixed scroll 220 may not form part of the overall housing of the scroll pump 200 and instead may be located entirely within the overall housing.

The orbiting scroll 230 is located within the overall housing of the scroll pump 200 and intermeshed with the fixed scroll 220. The orbiting scroll 230 is configured to orbit relative to the fixed scroll 220 to pump fluid from an inlet (not shown) of the scroll pump 200 to an outlet (not shown) of the scroll pump 200. The physical mechanism by which fluid is pumped by the orbiting of the orbiting scroll 230 relative to the fixed scroll 220 is well known and will not be described herein.

The fixed scroll 220 comprises a first base 222, a first spiral wall 224, an outer wall 226 and an inner wall 228. The orbiting scroll 230 comprises a second base 232 and a second spiral wall 234. In this embodiment, the fixed and orbiting scrolls 220, 230 each have a respective central aperture 500 and 502.

The first spiral wall 224 extends perpendicularly from the first base 222 towards the second base 232. The outer wall 226 extends perpendicularly from the first base 222 towards the second base 232. The outer wall 226 is located radially outwards of the first spiral wall 224 and defines an outer periphery of the fixed scroll 220. Thus, the outer wall 226 extends around the first spiral wall 224. The second spiral wall 234 extends perpendicularly from the second base 232 towards the first base 222. The inner wall 228 extends perpendicularly from the first base 222 towards the second base 232. The inner wall 228 is located radially inwards of the first spiral wall 224 between the central aperture and the first spiral wall 224. The inner wall 228 is adjacent to the central aperture of the fixed scroll 220.

The second base 232 comprises a peripheral portion 236 which is located radially outwards of the second spiral wall 234 and which defines an outer periphery of the orbiting scroll 230. The second base 232 also comprises a radially inner portion 238 which is located radially inwards of the second spiral wall 234 between the central aperture of the orbiting scroll 230 and the second spiral wall 234. The radially inner portion 238 is adjacent to the central aperture. In this embodiment, the first base 222, first spiral wall 224, outer wall 226 are integrally formed with each other. Also, in this embodiment, the second base 232 and second spiral wall 234 are integrally formed with each other.

The first and second channel seals 300, 310 are seals located in the channel between the fixed and orbiting scrolls 220, 230. The first channel seal 300 is adjacent to the second base 232 and fully extends across the width of the channel defined by the second spiral wall 234. The first channel seal 300 is located between the first spiral wall 224 and the second base 232. The second channel seal 310 is adjacent to the first base 222 and fully extends across the width of channel defined by the first spiral wall 224. The second channel seal 310 is located between the second spiral wall 234 and the first base 222.

The first spiral wall 224 and second spiral wall 234 are intermeshed with each other such that an end surface of the first spiral wall 224 is in contact with an opposing surface of the first channel seal 300, and an end surface of the second spiral wall 234 is in contact with an opposing surface of the second channel seal 310. In this way, the first channel seal 300, first spiral wall 224, second channel seal 310 and second spiral wall 234 together define a space between the fixed and orbiting scrolls 220, 230 which is used by the scroll pump 200 during operation to pump fluid.

The drive shaft 240 is coupled to the orbiting scroll 230 and configured to rotate to drive the orbiting of the orbiting scroll 230. The drive shaft 240 is located within the overall housing of the scroll pump 220. In this embodiment, the drive shaft 240 is coupled to the orbiting scroll 230 and shell 210 via the plurality of bearings which facilitate rotation of the drive shaft 240. In this embodiment, the drive shaft 240 extends through the central apertures of the fixed and orbiting scrolls 220, 230. This configuration tends to enable placement of the bearings in the pump's exhaust, which tends to keep bearing grease and contamination away from the pump's inlet.

The actuator (e.g. a motor) is coupled to the drive shaft 240 and configured to actuate the drive shaft 240 to cause the drive shaft 240 to rotate to drive the orbiting of the orbiting scroll 230. The actuator is located within the overall housing of the scroll pump 220.

The biasing apparatus (not shown but identical to biasing apparatus 170 of FIG. 1) is configured to bias the fixed and orbiting scrolls 220, 230 against each other. More specifically, the biasing apparatus is configured to bias the orbiting scroll 230 towards the fixed scroll 220 such that the orbiting scroll 230 is axially loaded against the fixed scroll 220. In more detail, the biasing is such that the end surface of the first spiral wall 224 is pressed against the opposing surface of the first channel seal 300, and the end surface of the second spiral wall 234 is pressed against the opposing surface of the second channel seal 310. Thus, part of the axial load on the fixed and orbiting scrolls 220, 230 is supported by the end surfaces of the first and second spiral walls 224, 234. The axial loading caused by the biasing apparatus maintains a seal between the end surfaces of the first and second spiral walls 224, 234 and the respective opposing surfaces of the first and second bases 222, 232. This tends to act to prevent undesired leakage of fluid between different radial portions of the space between the fixed and orbiting scrolls 220, 230. In this embodiment, the biasing apparatus comprises one or more springs which are configured to exert a force on the orbiting scroll 230 via the drive shaft 240 to bias the orbiting scroll 230 towards the fixed scroll 220.

The first pad 280 is located radially outwards of the first and second spiral walls 224, 234. More specifically, the first pad 280 is located between the outer wall 226 of the fixed scroll 220 and the base 232 of the orbiting scroll 230. More specifically, the first pad 280 is located between the outer wall 226 and the peripheral portion 236 of the second base 232 such that the first pad 280 is in contact with both the outer wall 226 and the peripheral portion 236. In other words, the first pad 280 is sandwiched between the outer wall 226 and the peripheral portion 236 of the second base 232. In this way, the first pad 280 is located such that part of the axial load on the fixed and orbiting scrolls 220, 230 is supported by the first pad 280. Thus, the peripheral portion 236 is biased against the outer wall 226 via the first pad 280. The first pad 280 is formed from a different material to the fixed and orbiting scrolls 220, 230.

In this embodiment, the first pad 280 is integrally formed with the first channel seal 300. Also, the first pad 280 is the same thickness as the first channel seal 300. In other words, the first pad 280 may be said to be an extension of the first channel seal 300. In this embodiment, the first pad 280 is formed from a material with high wear resistance when slid against the material or materials from which the fixed and orbit scrolls 220, 230 are made. For example, the first pad 280 may be able to withstand a contact load of 10N to 1000N at a sliding speed of 0.2 m/s to 5 m/s for a service life of 1 to 10 years. For example, the first pad 280 may be formed from a polymer material (e.g. a polytetrafluoroethylene material, optionally comprising carbon and/or glass to improve wear resistance) and the fixed and orbiting scrolls 220, 230 may be formed from a metallic material (e.g. a light-weight metallic material such as aluminium, magnesium or titanium). Aluminium may be particularly desirable as it is a relatively low cost light-weight material.

The second pad 190 is located radially inwards of the first and second spiral walls 224, 234. More specifically, the second pad 290 is located between the inner wall 228 of the fixed scroll 220 and the base 232 of the orbiting scroll 230. More specifically, the second pad 290 is located between the inner wall 228 and the radially inner portion 238 of the second base 232 such that the second pad 290 is in contact with both the inner wall 228 and the radially inner portion 238. In other words, the second pad 290 is sandwiched between the inner wall 228 and the radially inner portion 238. The second pad 290 is located radially inwards of the first and second spiral walls 224, 234 between the central apertures of the fixed and orbiting scrolls 220, 230 and the first and second spiral walls 224, 234. The second pad 290 is adjacent to the central apertures.

In this way, the second pad 290 is located such that part of the axial load on the fixed and orbiting scrolls 220, 230 is supported by the second pad 290. Thus, the radially inner portion 238 is biased against the inner wall 228 via the second pad 290. The second pad 290 is formed from a different material to the fixed and orbiting scrolls 220, 230.

In this embodiment, the second pad 290 is integrally formed with the first channel seal 300. Also, the second pad 290 is the same thickness as the first channel seal 300. In other words, the second pad 290 may be said to be an extension of the first channel seal 300. In this embodiment, the second pad 290 is formed from the same material as the first pad 280. In this embodiment, the second pad 290 is formed from a material with high wear resistance when slid against the material or materials from which the fixed and orbit scrolls 220, 230 are made. For example, the second pad 290 may be able to withstand a contact load of 10N to 1000N at a sliding speed of 0.2 m/s to 5 m/s for a service life of 1 to 10 years. For example, the second pad 290 may be formed from a polymer material (e.g. a polytetrafluoroethylene material, optionally comprising carbon and/or glass to improve wear resistance) and the fixed and orbiting scrolls 220, 230 may be formed from a metallic material (e.g. a light-weight metallic material such as aluminium, magnesium or titanium). Aluminium may be particularly desirable as it is a relatively low cost light-weight material.

In this embodiment, during operation of the scroll pump 200 in which the orbiting scroll 230 orbits relative to the fixed scroll 220, the end surfaces of the first and second spiral walls 224, 234 slide against the respective opposing surfaces of the first and second channel seals 300, 310. This in combination with the above-mentioned axial loading means that the end surfaces of the first and second spiral walls 224, 234 and the respective opposing surfaces of the channel seals 300, 310 tend to experience frictional forces during operation of the scroll pump 200.

The presence of the first and second pads 280, 290, which support at least part of the axial load, tends to mean that a smaller proportion of the axial load is supported by the end surfaces of the first and second spiral walls 224, 234 and the respective opposing surfaces of the channel seals 300, 310. This, in turn, tends to reduce the frictional forces on the end surfaces of the first and second spiral walls 224, 234 and the respective opposing surfaces of the channel seals 300, 310.

The second pad 290 also provides an additional seal which tends to prevent undesired fluid flow in and out of the space between the fixed and orbiting scrolls. This tends to prevent a vacuum forming in other parts (e.g. the part of the housing containing the actuator) of the scroll pump 200 and also tends to prevent pumped fluid entering other parts (e.g. the part of the housing containing the actuator) of the scroll pump 200.

Figure 3:
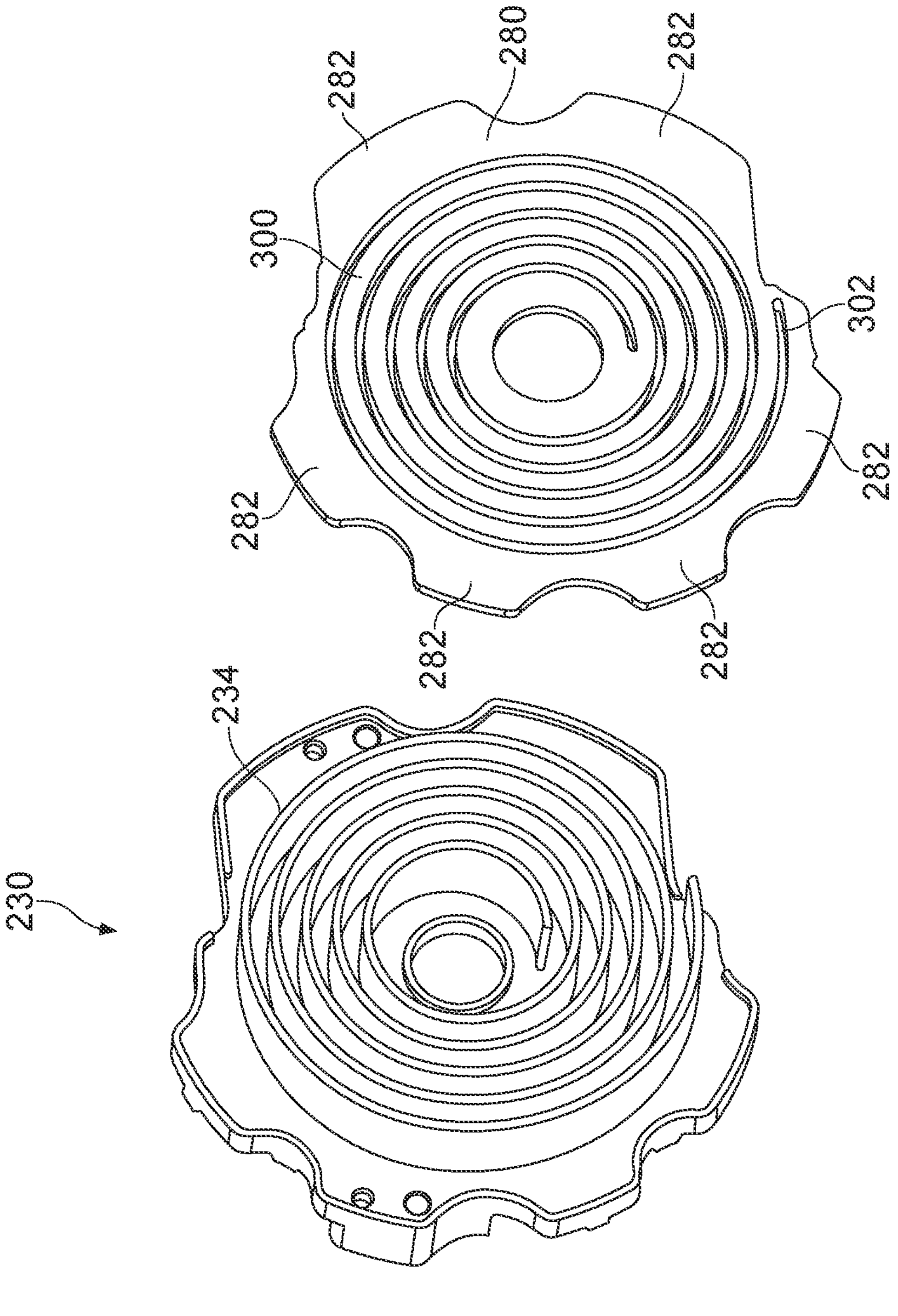
FIG. 3 is a schematic illustration (not to scale) showing perspective views of an orbiting scroll and a channel seal of the scroll pump illustrated in FIG. 2.

FIG. 3 is a schematic illustration (not to scale) showing perspective views of the orbiting scroll 230 and the first channel seal 300.

The channel seal 300 comprises a spiral gap 302 which matches the shape and size of the second spiral wall 234 such that the second spiral wall 234 is able to snugly fit through the spiral gap 302. The channel seal 300 also comprises a central aperture which matches the shape and size of the central aperture of the orbiting scroll 230 so that the drive shaft 240 is able to extend through the channel seal 300.

In this embodiment, the first pad 280 comprises a plurality of lobes 282 with cut-out portions therebetween. The cut-out portions between the lobes provide space for other parts of the scroll pump 200 to reside (e.g. space for a mechanism that prevents the orbiting scroll from rotating and/or space for screws that secure a cover over the orbiting scroll). This tends to enable the overall pump size to be reduced compared to a first pad 280 without lobes 282.

Thus, a scroll pump is provided.

Advantageously, in the above-described embodiments, the spiral walls tend to experience reduced wear during operation of the scroll pump. Thus, the scroll pump tends to have better overall durability.

Advantageously, the above-described scroll pumps tend to allow a pressure-velocity value of the scroll pump to be kept relatively low so that the walls and the seals of the scroll pump are not damaged.

Advantageously, in embodiments which include a channel seal, the channel seal tends to experience reduced wear during operation of the scroll pump. Thus, the channel seal tends to have better overall durability.

Advantageously, in embodiments in which a pad is integrally formed with a channel seal, the pad tends to be easily manufactured as it can be manufactured along with the channel seal rather than being manufactured separately. Also, making the channel seal and pads in one piece tends to enable the channel seal and pads to be easily manufactured with the same thickness. In this way, the end clearance between the scroll walls and the channel seals tends to be near zero, which tends to minimise leakage of the pumped fluid and maximise pump performance.

In the above embodiments, the biasing apparatus comprises one or more springs. However, in other embodiments, the biasing apparatus comprises a different type of device to provide biasing instead of or addition to the one or more springs.

In the above embodiments, the outer wall extends from the fixed scroll. However, in other embodiments, the outer wall extends from the orbiting scroll instead.

In the above embodiment of FIG. 2, the scroll pump comprises a second pad and the scrolls comprise central apertures. However, in other embodiments, the scroll pump comprises a second pad without the presence of the central apertures. In some embodiments, the scroll pump comprises the central apertures without a second pad. In some embodiments, the second pad and the central apertures are all omitted.

In the above embodiment of FIG. 2, due to the pads 280, 290, the wear rate tends to be very low on the spiral wall to seal interface that is in line with the pads 280, 290 (i.e. the one formed by the first spiral wall 224 and the first channel seal 300). In some embodiments, the second spiral wall 234 is higher than the first spiral wall 224 (e.g. by 5 to 10 microns). In these embodiments, all the load would be initially taken on the end surface of the second spiral wall 234, which would cause the second channel seal 310 to wear rapidly until the pads 280, 290 and first channel seal 300 come into contact with fixed scroll 220. This tends to ensure that both spiral wall to seal interfaces have near zero clearance during operation. Alternatively, in some embodiments, the second channel seal 310 is a spring energised channel seal, which tends to ensure that both spiral wall to seal interfaces have near zero clearance from the first moment of operation.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A scroll pump comprising:

a first scroll comprising a first spiral wall and an inner wall located radially inward from the first spiral wall;

a second scroll comprising a base and a second spiral wall extending from the base, the second spiral wall being intermeshed with the first spiral wall;

a first pad formed from a different material to the first and second scrolls, the first pad being located between the first and second scrolls radially outwards of the first and second spiral walls;

a second pad formed from a different material to the first and second scrolls, the second pad being located between the first and second scrolls radially inwards of the first and second spiral walls and axially between the inner wall of the first scroll and the base of the second scroll, the inner wall and second pad preventing a fluid flow out of a space between the first scroll and the second scroll to a central aperture; and a biasing apparatus configured to bias the first and second scrolls against each other via the first and second pads.

2. The scroll pump of claim 1, wherein one or both of the first and second pads is formed from a polymer material and the first and second scrolls are formed from a metallic material.

3. The scroll pump of claim 2, wherein one or both of the first and second pads is formed from a polytetrafluoroethylene material and the first and second scrolls are formed from aluminium.

4. The scroll pump of claim 1, further comprising a channel seal located between the first and second scrolls.

5. The scroll pump of claim 4, wherein one or both of the first and second pads is integrally formed with the channel seal.

6. The scroll pump of claim 4, wherein one or both of the first and second pads is formed from the same material as the channel seal.

7. The scroll pump of claim 1, wherein the second pad is formed from the same material as the first pad.

8. The scroll pump of claim 1, further comprising a drive shaft coupled to the second scroll and configured to cause the second scroll to orbit relative to the first scroll.

9. The scroll pump of claim 8, wherein the drive shaft extends through the central aperture.

10. The scroll pump of claim 1, wherein the first pad comprises a plurality of lobes.

* * * * *